United States Patent [19]

Westell

[11] 4,156,914
[45] May 29, 1979

[54] COMPUTER IMAGE DISPLAY SYSTEM AND PROCESSOR THEREFOR

[75] Inventor: William E. Westell, Weston, Mass.

[73] Assignee: Baird Corporation, Bedford, Mass.

[21] Appl. No.: 825,693

[22] Filed: Aug. 18, 1977

[51] Int. Cl.² .......................... G06J 1/00; G06G 7/19
[52] U.S. Cl. .................................... 364/515; 358/903;
364/518; 364/604; 364/825
[58] Field of Search .............. 364/514, 515, 518, 521,
364/604, 724, 728, 819, 822, 825; 350/162 SF;
358/903, 160

[56] References Cited

U.S. PATENT DOCUMENTS

| 3,337,870 | 8/1967 | Allen et al. ...................... 364/819 X |
| 3,809,873 | 5/1974 | Klahr .................................. 364/822 |
| 3,971,921 | 7/1976 | Schmit et al. .................... 364/822 X |
| 4,025,772 | 5/1977 | Constant ............................ 364/728 |

OTHER PUBLICATIONS

Crooker et al. "Measurement of Optical Autocorrelation Functions Using a Signal Averager" Rev. of Sci. Instrum., vol. 47, No. 5, May 1976.

*Primary Examiner*—Joseph F. Ruggiero
*Attorney, Agent, or Firm*—Morse, Altman, Oates & Bello

[57] ABSTRACT

A computer image display system in which digital sampled data, generated by an image transducer and processed by a computer, is convolved with a Gaussian function in a display processor in order to produce a continuous analog image presentation on a diplay. First, the Gaussian function is convolved vertically with computer stored intensities in a vertical slice of interest, that is, multiplied by those intensity values in the vertical slice and summed to derive a resultant intermediate value on a given horizontal line. Then, the Gaussian function is convolved with the resultant intermediate value on a given horizontal line in order to derive final values which are to be displayed.

13 Claims, 6 Drawing Figures

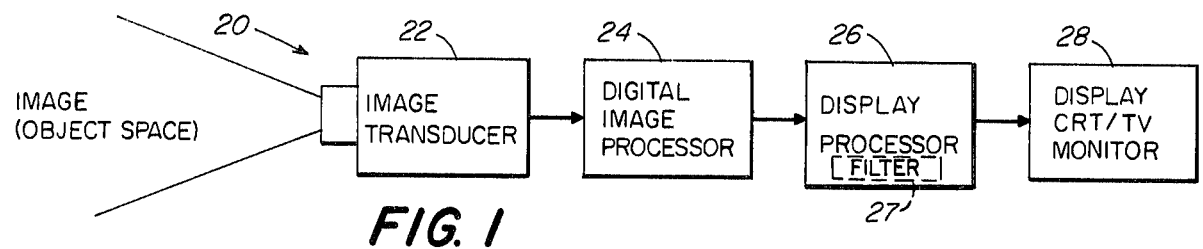
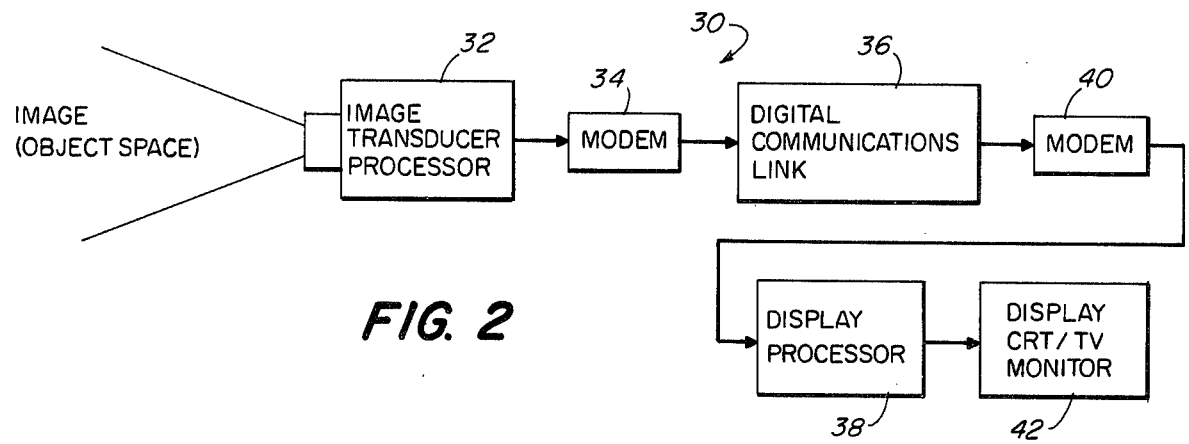
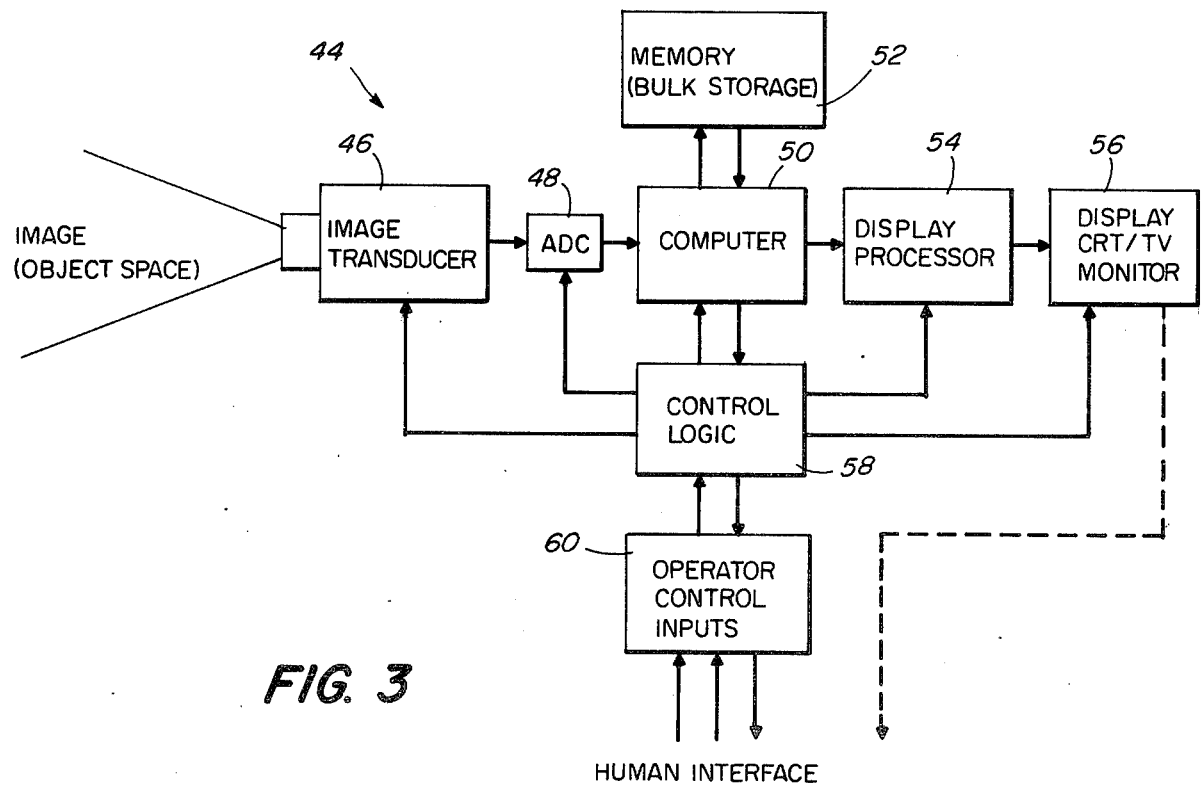

COMPUTER IMAGE DISPLAY SYSTEM AND PROCESSOR THEREFOR

BACKGROUND OF THE INVENTION

1. Field of the Invention

The present invention relates to display systems and, more particularly, is directed towards computer displays, TV displays, digital image processing, radiographic instrumentation, two-dimensional spatial matched filtering, sampled-data reconstruction (interpolation and smoothing), optical image processing, solid-state imaging array display and low-bandwidth TV picture transmission and reception.

2. Description of the Prior Art

Two-dimensional images that have been spatially-sampled, for example in computer processing, generate display artifacts due to aliasing, leakage and data quantization if the digital image data is simply converted to analog intensity values and is displayed directly. These artifacts seriously degrade the quality of image perception. The well-known electrical communication theory solution to minimize display artifacts includes the use of a sharp cut-off low-pass filter having a sin x/x weighting function (impulse response) with zeroes matched to the sampling intervals. In addition, an aliasing filter is employed before sampling to satisfy the band-limiting requirements (Nyquist Limit) of the classical sampling theorem.

However, implementation of this theoretically-optimum technique for sampled-data reconstruction, interpolation and smoothing is often impractical even for one-dimensional data because (1) the sin x/x response requires a very high order filter (many poles) to merely approximate the theoretical optimum, and (2) the sin x/x time response must be maintained precisely matched to the sampling rate to avoid spurious artifacts (aliasing or moiré effects). Two-dimensional implementation is even more impractical because of complexity and criticality of matching; with serious artifact generation resulting from only slight mismatching. Practical approximations to the ideal filter generate artifacts which are particularly noticeable when the image is moved, especially when the image is rotated.

SUMMARY OF THE INVENTION

It is an object of the present invention to provide a computer image display system and processor which does not suffer from the heretofor mentioned disadvantages and limitations.

Another object of the present invention is to provide a computer image display system and processor employing non-critical and practical techniques.

A futher object of the present invention is to provide an optical matched filter for optimization of image perception by minimizing display noise.

A still further object of the invention is to provide a computer image display system in which digital sampled data, generated by an image transducer and processed by a computer, is convolved with a Gaussian function in a display processor in order to produce a continuous analog image presentation on a display. The processor includes a two-dimensional Gaussian interpolation filter. The Gaussian function provides data smoothing having rotational symmetry of the final display response. The processing can be performed by simple sequential operation on X and Y coordinate data. The equivalent one-dimensional Gaussian function is first convolved vertically with computer stored intensities in a vertical slice of interest. That is, Gaussian function is multiplied by intensity values in the vertical slice and summed to derive resultant intermediate values at each point on a given horizontal line. The same equivalent one-dimensional Gaussian function is then convolved with these resultant intermediate values on a given horizontal line in order to derive final values which are to be displayed.

Other objects of the present invention will in part be obvious and will in part appear hereinafter.

The invention accordingly comprises the methods and systems, together with their steps, parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a block diagram of a digital image-processor and display system embodying the present invention;

FIG. 2 is a block diagram of a digital communications link embodying the present invention;

FIG. 3 is a block diagram of a computer image-processor and display system embodying the present invention;

DETAILED DESCRIPTION OF THE PREFERRED EMBODIMENTS

Figure 4A:
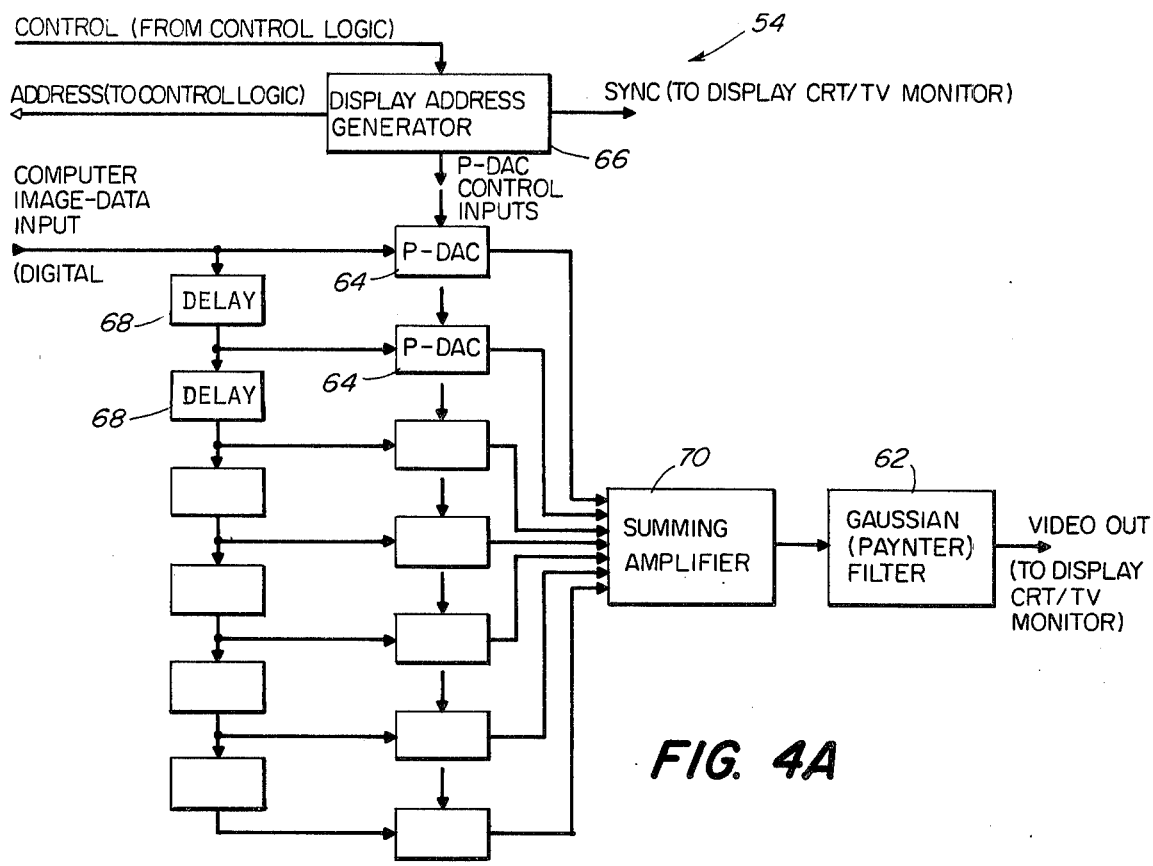
FIG. 4A is a block and schematic diagram of the image-processor embodying the present invention.

Referring now to the drawings, particularly FIG. 1, there is shown a digital image-processor and display system 20 for computer processing and display of signals generated by an image transducer 22, for example a camera, such as a TV camera, a solid state camera, an infrared camera or a gamma-camera. Image transducer 22 includes an imager such as a lens or collimator and an image sensor such as an image dissector, an image orthicon, a vidicon, a solid state array such as a charge-coupled device, a charge-injection device, silicon-diode or infrared-detector array, or a multi-crystal photomultiplier array of the type used in a gamma camera. The signals generated by transducer 22 are processed in an image processor 24 which generates digital data representation of the sensed image. Image processor 24 is operative to correct diffiences and/or limitations of transducer 22, for example, corrects for improper responses, image distortion, non-uniformity of the response, etc. The digital data generated by image processor 24 is applied to a display processor 26 which includes a two-dimensional Gaussian interpolation filter 27 that convolves the digital data with the Gaussian function for continuous analog image presentation on a display 28, for example, a cathode-ray tube television monitor. As hereinafter described in connection with the detailed description of processor 26, the Gaussian function is first convolved vertically with computer stored intensities in a vertical slice of interest, that is, multiplied by those intensity values in the vertical slice and summed to derive resultant intermediate values at each point on a given horizontal line. Then, the same equivalent one-dimensional Gaussian function is convolved with these resultant intermediate value on a given horizontal line to derive the final values which are presented on display 28.

FIG. 2 shows a digital communications link 30 for transmission of video picture data. Digital communications link 30 includes an image transducer-processor 32 which is similar to image transducer 22 and image processor 24 in structure and function. Digital data generated by transducer-processor 32 are fed through a modem 34 to a digital communications link 36. The signals transmitted via communications link 36 are applied to a display processor 38 through a modem 40. Modem 34 constitutes an interface device for communications link 36 and image transducer-processor 32, and modem 40 constitutes an interface device for display processor 38 and communications link 36. Display processor 38 is similar in construction and function to display processor 26. The signals generated by display processor 38 are applied to a display 42, for example, a cathode-ray tube television monitor.

A digital computer image-processor and display sytem 44, shown in FIG. 3, includes an image transducer 46 which is similar in structure and function to image tranducer 22. Data signals generated by image transducer 46 are converted to digital format by an analog to digital converter 48 for processing by a computer 50. A memory 52, which is interconnected with computer 50, is provided for storage of the processed data. Digital data signals generated by computer 50 are applied through a display processor 54 to a display 56, for example a cathode-ray tube television monitor. Display processor 54 is similar in construction and operation to display processor 26. A control logic 58, which is interconnected with image transducer 46, analog to digital converter 48, computer 50, display processor 54, and display 56, provides real-time control of display system 44 with supervisory control from an operator's control unit 60. Control logic 58 controls or synchronizes all the subsystems in the information channel from transducer 46 to display 56.

As previously indicated and as hereinafter described in connection with FIGS. 4, 5 and 6, the invention features a Gaussian interpolation filter which provides improvements over prior practical approximations to the ideal sin x/x interpolation filter. The Gaussian interpolation filter is particularly suitable for X-Y array display and TV format displays becuase it provides rotational symmetry of the final display response with simple sequential operation of the X and Y coodinate data smoothing. Rotational symmetry with TV compatible sequential X-Y data processing is achieved by use of the Gaussian function which inherently has this property. Both the Gaussian function approximation and its match to the sampling rate are inherently non-critical in the light of commercial standards.

The Gaussian function provides an excellent matched filter capability (maximizes the image signal-to-noise ratio) for an exceptionally large class of image structures. This capability is particularly significant for quantum-limited scanning system, e.g. radiographic instrumentation limited by count rates of particle detections. In the quantum-limited system, the Gaussian filter is matched to the imaging system's optical transfer function (OTF), which consists of both the amplitude or modulation transfer function (MTF) and the phase (argument) function. Alternately, the match can be made in the inverse transform (space) domain in which the system weighting function (impulse response or optical spread function) is matched by the Gaussian weighting function.

The Gaussian function offers dramatic enhancement of perception, particularly with a low pixel (picture element) count and/or with low image contrasts, and/or with low signal-to-noise ratios.

The invention is described in the context of the standard TV format. It will be obvious that these techniques are equally applicable to other formats and other combinations of digital and analog data processing. This invention makes each TV display pixel intensity proportional to the Gaussian weighted sum of computer stored intensity values in accordance with the following procedure:

(1) The standard deviation ($\sigma$) of the Gaussian matched filter is determined from the OTF and sampling rate. The two-dimensional (x-y) imaging system spread function (impulse response or weighting function) approximated by $(1/2\pi\sigma^2)e^{-\frac{1}{2}(x^2+y^2/\sigma^2)}$ (where $\sigma$ is the standard deviation of the spread function) is the inverse Fourier Transform of the system OTF which is approximated by $e^{-\frac{1}{2}[(\omega x \sigma)^2 + (\omega y \sigma)^2]}$. Since typical imaging systems have a symmetrical or even spread function, the optimum matched filter spread function which minimizes detector and/or shot noise is identical to the system spread function. Analysis has shown the Gaussian function to be an excellent approximation, in the matched filter sense, to typical imaging system spread functions. Matching is effected by equating full-width-half-maximums (FWHM). The Gaussian function $(1/2\pi\sigma^2)e^{-\frac{1}{2}(x^2+y^2/\sigma^2)}$ has a FWHM approximately equal to 2.35 $\sigma$. As previously indicated, the match is non-critical due to the Gaussian functional properties. The sampling rate is chosen to satisfy the Nyquist Limit with respect to the product of system input image spectrum and system OTF.

(2) This Gaussian function is first convolved vertically with computer-stored intensities in the vertical slice of interest, i.e. multiplied by those intensity values in the vertical slice and summed to derive the resultant intermediate value on a given horizontal line.

(3) This same Gaussian function is then convolved with the resultant intermediate values on a given horizontal line to derive the final value to be displayed.

It should be noted that the vertical and horizontal convolutions are performed sequentially. The unique property of the Gaussian function, having the same canonical form for both transform and inverse transform, leads to the desired properties of rotational (circular) symmetry of both the spread function and transform (OTF), and of two-dimensional convolutions equivalent to sequential convolutions of the one-dimensional spread functions (equivalent to sequential multiplications of the one-dimensional transform in the image transform domain).

Thus the two-dimensional matched filter Gaussian transform (OTF) and its inverse transform (Gaussian spread function) are invariant with rotation. This means that the final display image will have no change in the apparent image structure perceived as the system input image in object space is moved, or is rotated, or is translated normal to the system optical axis, or is translated parallel to the system optical axis (zoomed).

The properties and advantages described above are made evident by an examination of the mathematical descriptions of the Gaussian-function matched filter, which has a computer-display spread function (weighting function) given by:

$$h(x-x_i, y-y_i) = \frac{1}{2\pi\sigma^2} e^{-\frac{1}{2}\frac{(x-x_i)^2 + (y-y_i)^2}{\sigma^2}} \quad (1)$$

where X, Y are the horizontal and vertical coordinates of the display image points, and Xi, Yi are the computer data-input points. The spread function standard deviation is matched to the imaging system FWHM by scaling $\sigma$ to achieve:

$$\sigma = \text{FWHM}/2.35 \quad (2)$$

This weighting function has an OTF: $F(\omega_x, \omega_y)$ given by:

$$F(\omega_x, \omega_y) = e^{-\frac{1}{2}[(\omega_x\sigma)^2 + (\omega_y\sigma)^2]} \quad (3)$$

where $\omega_x, \omega_y$ are the horizontal and vertical spatial frequencies of the display image. This represents the spatial frequency content for a single data point input to the matched filter. This OTF was derived from the two-dimensional Fourier Transform of the matched-filter spread function:

$$F(\omega_x, \omega_y) = \int_{-\infty}^{+\infty} \int_{-\infty}^{+\infty} h(x,y) e^{-j\omega_x x - j\omega_y y} dx\, dy \quad (4)$$

The circular symmetry of the Gaussian matched-filter spread function is shown in the space domain from:

$$h(x-x_i, y-y_i) = h(r) = \frac{1}{2\pi\sigma^2} e^{-\frac{1}{2}\frac{r^2}{\sigma^2}} \quad (5)$$

where:

$$r^2 = (x-x_i)^2 + (y-y_i)^2 \quad (6)$$

and is shown in the spatial frequency domain (OTF) from $$F(\omega_x, \omega_y) = F(\omega_r) = e^{-\frac{1}{2}(\omega_r\sigma)^2} \quad (7)$$

where $$\omega_r^2 = \omega_x^2 + \omega_y^2 \quad (8)$$

The Gaussian function also provides multiplicative separability of vertical and horizontal components in the matched-filter convolution integral which gives the computer-display brightness B (x,y):

$$B(x,y) = B_o \int_{-\infty}^{+\infty} \int_{-\infty}^{+\infty} f(x_i,y_i) h(x-x_i, y-y_i) dx_i\, dy_i \quad (9)$$

where $f(x_i,y_i)$ represents the computer data-input function, and $B_o$ is the display-brightness scale factor, a display-system constant.

The multiplicative separability, which permits sequential (vertical and horizontal) convolutions, now is shown by substitution of the Gaussian matched-filter expression into the brightness convolution integral:

$$\int_{x_i=x_{min}}^{x_i=x_{max}} e^{-\frac{1}{2}\left(\frac{x_i-x}{\sigma}\right)^2} \int_{y_i=y_{min}}^{y_i=y_{max}} e^{-\frac{1}{2}\left(\frac{y_i-y}{\sigma}\right)^2} f(x_i,y_i) dy_i\, dx_i \quad (10)$$

It will be apparent that the sequential (vertical and horizontal) convolutions of the matched Gaussian filter with the sampled image data can be performed by any multiplication and integration means, e.g. electronic digital and/or analog instrumentation means, optical processing (coherent or incoherent as with an optical diffuser), sonic or ultrasonic processing, chemical diffusion, or any other means which can provide an image convolution with a Gaussian spread function.

In the following description, the convolutions are described as a combination of digital multiplex to digital storage with digital-to-analog conversion and digitally-switched analog weighting for the vertical convolutions, and an electronic-wave filter 62 for the horizontal analog weighting-function convolution. Wave filter 62 is a four-pole Paynter filter which provides an excellent approximation to the ideal Gaussian function. These hybrid (digital and analog) computational techniques provide a practical, stable convolution instrumentation suitable for processing at video rates for TV display of computer-stored images.

Referring now to FIG. 4A, there is shown a block and schematic diagram of display processor 54 with control inputs from control logic 58 and image data inputs from computer 50. The control inputs from control logic 58 are applied to programmable digital to analog converters 64 via a display address generator 66. The image data inputs from computer 50 are applied to shift registers 68 and digital to analog converters 64. The signals at the output of digital to analog converters 64 are summed in a summing amplifier 70 and are applied to Gaussian filter 62.

In operation, the vertical convolutions are performed with both digital and analog computations. Then, the horizontal convolutions are performed with analog computations. Gaussian matched filter 62 is convolved with the image-data in accordance with the brightness convolution integral of equation (10). The vertical or Y direction convolution is performed by storing the image-data in registers 68, each of which delays the data by one computer-address horizontal line.

In the illustrated embodiment of FIG. 4A, by way of example, six registers 68 are shown. That is, six delays are provided for a total of seven computer-address horizontal lines being available for the display computation at any given instant, as computer control logic 58 multiplexes the image-data to shift registers 68 for display. For example, with 64 horizontal lines of computer data, and 512 horizontal TV lines for standard 525-line TV format, each computer address line has an equivalent width of 8 TV lines (4 per field with 2:1 interlace).

Figure 4B:
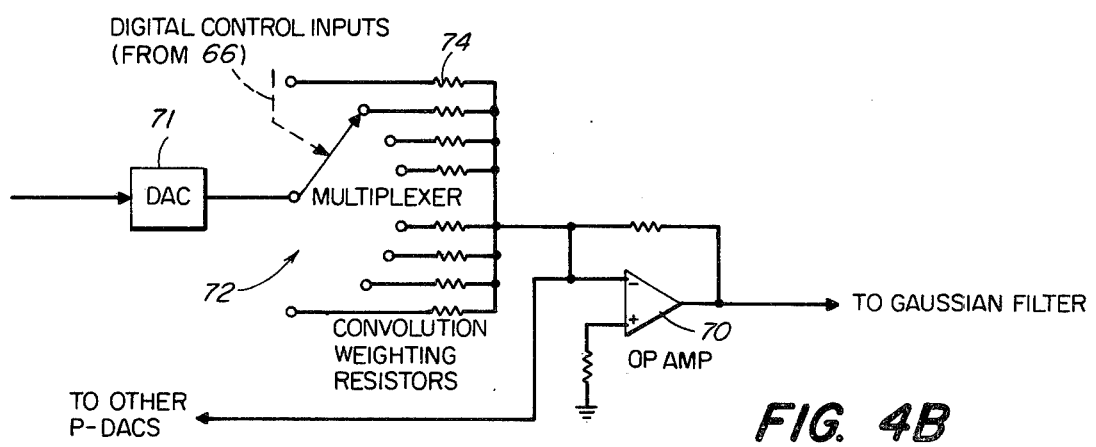
FIG. 4B is a schematic diagram illustrating vertical convolution principles of the invention.

As schematically shown in FIG. 4B, the vertical convolution is performed by the weighting provided by programmable digital to analog converters 64 and analog summing amplifier 70 in accordance with equation (10). Programmable digital to analog converters 64 include a digital to analog converter 71 and a multiplexer 72. Control logic 58 and display address generator 66 control multiplexer 72 which switches convolution-weighting resistors 74 in programmable digital to analog converters 64 into the input of summing amplifier 70, for example an operation amplifier. This switching provides a vertical convolution sum which is equivalent to the Y direction inner integral of equation (10).

Figure 4C:
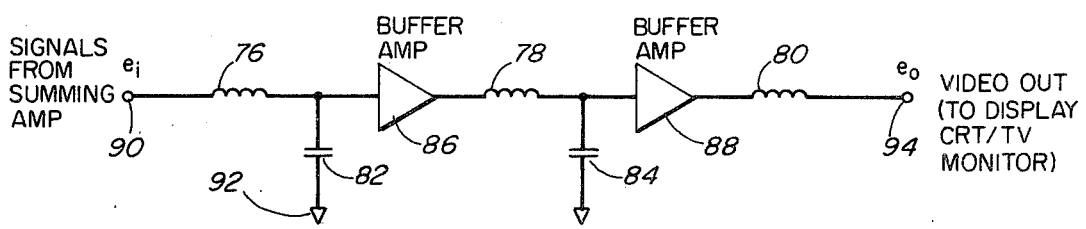
FIG. 4C is a schematic diagram illustrating horizontal convolution principles of the invention.

Referring now to FIG. 4C Gaussian filter 62, for example a passive filter such as a four-pole Paynter filter includes coils 76, 78 and 80, capacitors 82 and 84, and buffer amplifiers 86 and 88. Coil 76 is connected between an input terminal 90 and the input of buffer amplifier 86, capacitor 82 connected between the input terminal of buffer amplifier 86 and a return 92. Coil 78 is connected between the output terminal of buffer amplifier 86 and the input terminal of buffer amplifier 88. Capacitor 84 is connected between the input terminal of buffer amplifier 88 and return 92. Coil 80 is connected between the output terminal of buffer amplifier 88 and an output terminal 94. In alternate embodiments, Gaussian filter 62 is other than a passive filter, for example an active filter having the same characteristics.

FIG. 4C illustrates the horizontal convolution, the outer integral of equation (10), with analog Gaussian filter 62 which is approximated by a four-pole Paynter filter. The transfer function of Paynter filter 62 is specified by damping ratios $\zeta$ and natural frequencies $\omega_n$ according to the time-scaled Gaussian matched-filter standard deviation $\sigma$ and the imaging system full-width-half-maximums (FWHM) with the following prescription:

Gaussin-Filter Transfer Function (Paynter approximation)

$$\frac{e_o(s)}{e_i(s)} = \frac{1}{\left[\left(\frac{s}{\omega_{n1}}\right)^2 + 2\zeta_1\left(\frac{s}{\omega_n}\right) + 1\right]\left[\left(\frac{s}{\omega_{n2}}\right)^2 + 2\zeta_2\left(\frac{s}{\omega_n}\right) + 1\right]} \quad (11)$$

where
$\zeta_1 = 0.842 \quad \zeta_2 = 0.277$
$\omega_{n1} = 0.643\, \omega_c \quad \omega_{n2} = 1.129\, \omega_c$ and
$\omega_c = \frac{2}{\sqrt{3}\,\sigma}; \quad \sigma = \frac{FWHM}{2.35}$ (matched filter)

FIGS. 4A, 4B and 4C illustrate the two-dimensional convolution which conforms to equation (10).

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An image display system comprising:
   (a) data processor means for generating digital data signals representing an image to be displayed;
   (b) display processor means connected to said data processor means for generating final display data signals, said display processor means including means for generating an intermediate signal representing vertical convolution of said digital data signal and Gaussian filter means for generating a final signal representing horizontal convolution of said intermediate signal; and
   (c) display means connected to said Gaussian filter means, said final signal applied to said display means for continuous analog image presentation on said display means.

2. The image display system as claimed in claim 1 wherein said means for generating said intermediate signal includes programmable digital to analog converter means and summing means for generating said intermediate signal.

3. The image display system as claimed in claim 2 wherein said digital data signals which define intensity values in a vertical slice of interest are multiplied by a Gaussian function in said programmable digital analog converter means and summed in said summing means to derive said intermediate signal on a given horizontal line.

4. The image display system as claimed in claim 3 wherein said programmable digital to analog converter means includes a plurality of convolution weighting resistors.

5. The image display system as claimed in claim 1 wherein said Gaussian filter is a four-pole Paynter filter.

6. The image display system as claimed in claim 1 wherein said vertical and horizontal convolutions are in accordance with a brightness convolution which is defined by $$B(x,y) = \frac{B_o}{2\pi\sigma^2} \int_{x_i = x_{min}}^{x_i = x_{max}} e^{-\frac{1}{2}\left(\frac{x_i-x}{\sigma}\right)^2} \int_{y_i = y_{min}}^{y_i = y_{max}} e^{-\frac{1}{2}\left(\frac{y_i-y}{\sigma}\right)^2} f(x_i,y_i)\, dy_i\, dx_i;$$

said vertical convolution equivalent to the inner integral and said horizontal convolution equivalent to the outer integral.

7. A processor for processing digital sampling data generated by a computer for presentation on a display, said digital sampling data defining intensity values at specified X and Y locations, said processor comprising:
   (a) programmable digital to analog converter means configured to receive said digital sampling data, said programmable digital to analog converter means generating a signal representing vertical convoluton of said digital sampling data;
   (b) summing means connected to said programmable digital to analog converter means for summing said vertical convolution signal, an intermediate signal presented at an output of said summing means; and
   (c) Gaussian filter means connected to said summing means for horizontal convolution of said intermediate signal, a final signal at an output of said Gaussian filter means defining a Gaussian function for continuous analog image presentation on said display.

8. The processor as claimed in claim 7 wherein said digital sampling data defining intensity values in a vertical slice of interest is multiplied by a Gaussian function in said programmable digital to analog converter means and summed in said summing means to derive said intermediate signal on a given horizontal line.

9. The processor as claimed in claim 8 wherein said programmable digital to analog converter means includes a plurality of convolution weighting resistors.

10. The processor as claimed in claim 7 wherein said Gaussian filter is a four-pole Paynter filter.

11. The processor as claimed in claim 7 wherein said vertical and horizontal convolutions are in accordance with a brightness convolution which is defined by $$B(x,y) = \frac{B_o}{2\pi\sigma^2} \sum_{x_i = x_{min}}^{x_i = x_{max}} e^{-\frac{1}{2}\left(\frac{x_i - x}{\sigma}\right)^2} \sum_{y_i = y_{min}}^{y_i = y_{max}} e^{-\frac{1}{2}\left(\frac{y_i - y}{\sigma}\right)^2} f(x_i, y_i) \, dy_i \, dx_i;$$

said vertical convolution equivalent to the inner integral and said horizontal convolution equivalent to the outer integral.

12. An image display system comprising:
(a) data processor means for generating data signals representing an image to be displayed;
(b) display processor means connected to said data processor means for generating final display signals, said display processor means including Gaussian function means and convolution means for convolving said data signals with a Gaussian function for generating Gaussian convolution signals; and
(c) display means connected to said convolution means, said Gaussian convolution signals applied to said display means for continuous analog image presentation on said display means.

13. An image display system comprising:
(a) data processor means for generating data signals representing an image to be displayed;
(b) display processor means connected to said data processor means for generating final display signals, said display processor means including Gaussian function and filter means for filtering said data signals with a Gaussian function for generating Gaussian filter signals; and
(c) display means connected to said filter means, said Gaussian filter signals applied to said display means for continuous analog image presentation on said display means.

* * * * *